April 2, 1935.  R. R. GUEMPEL  1,996,415
ASSEMBLING MACHINE
Filed Oct. 18, 1932  11 Sheets-Sheet 2
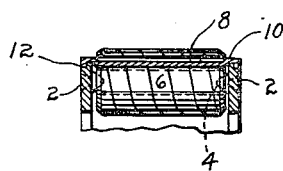
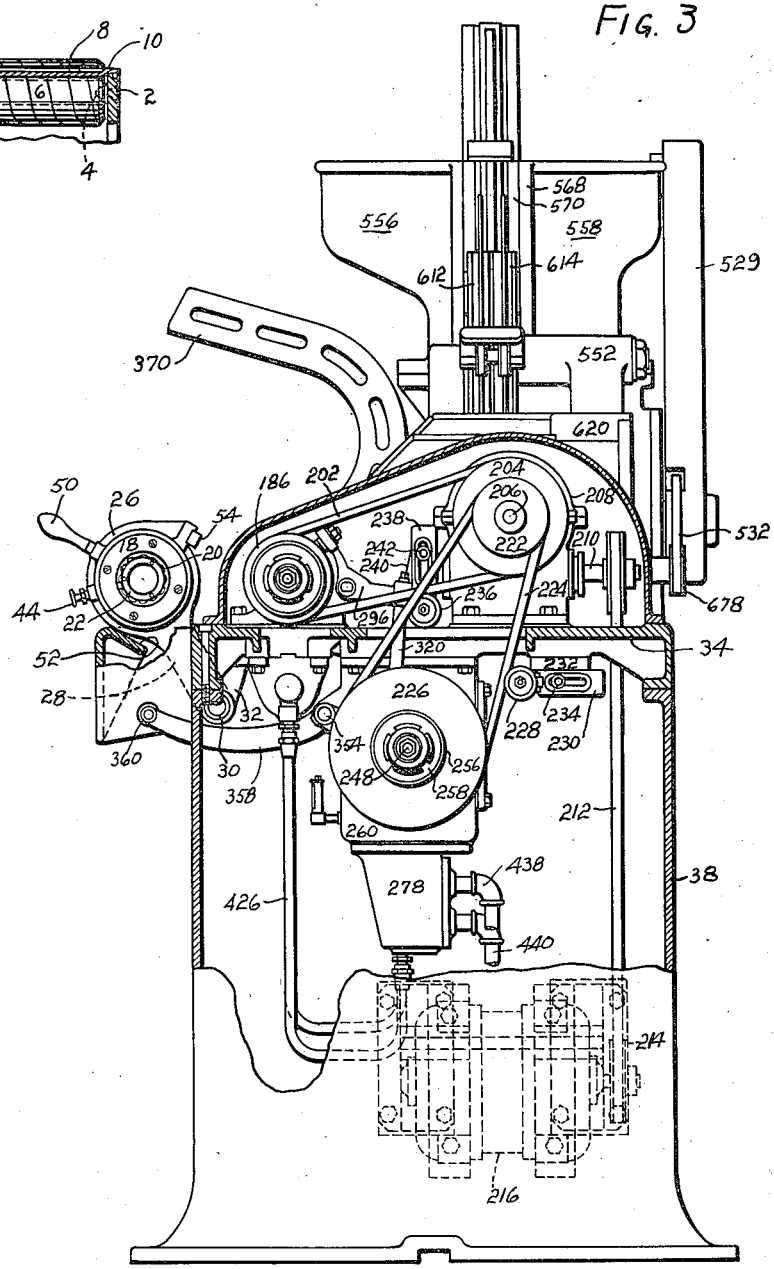
INVENTOR:
ROBERT R. GUEMPEL,
BY
HIS ATTORNEY.

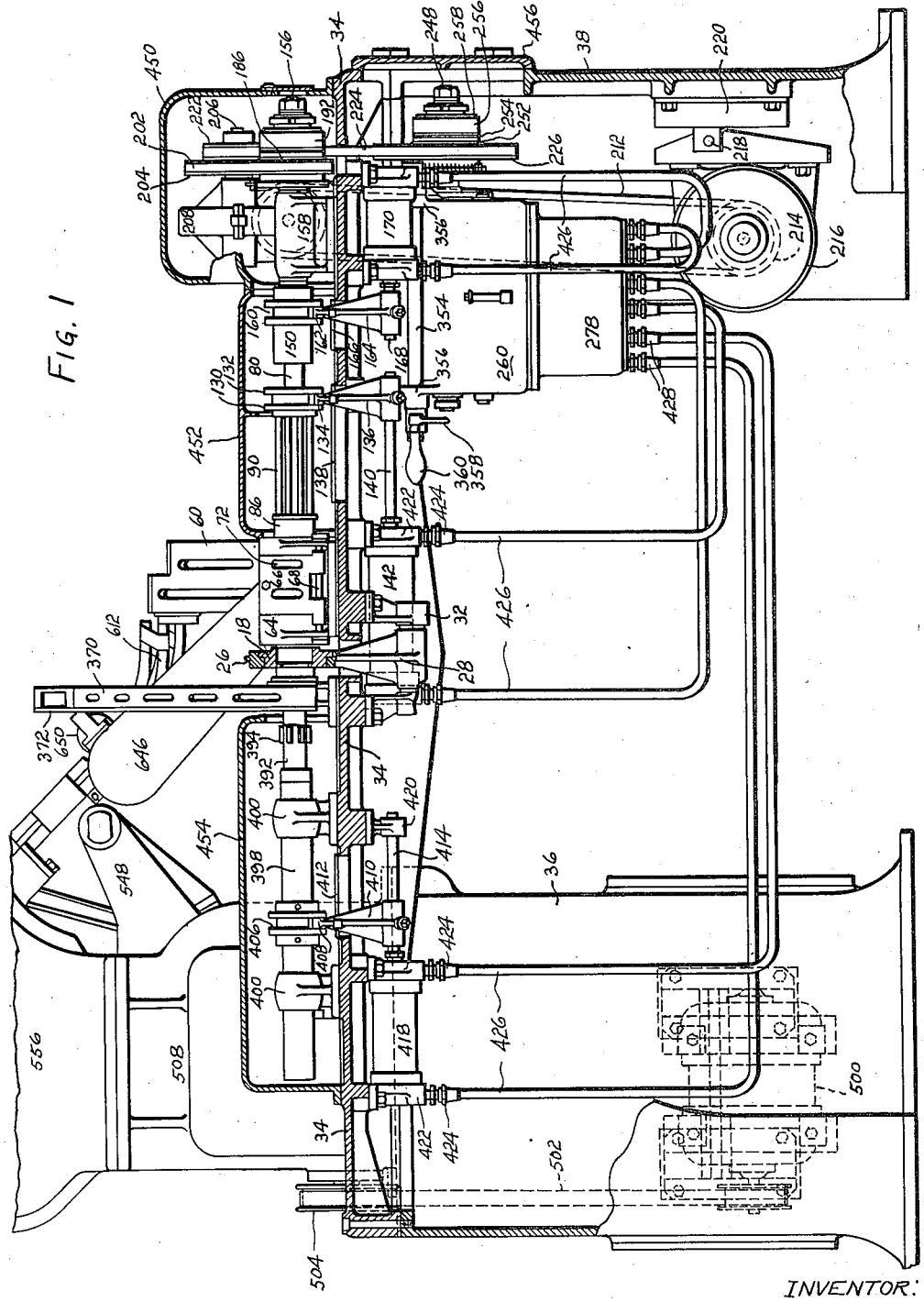

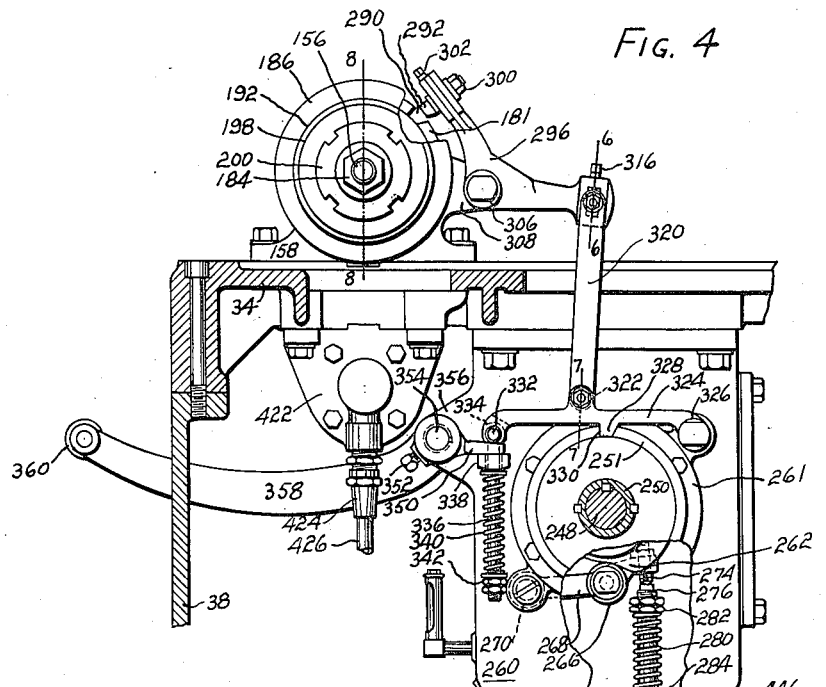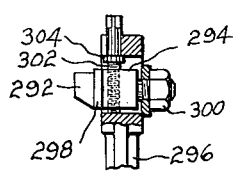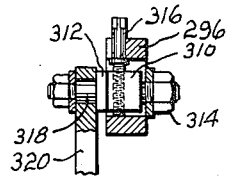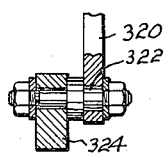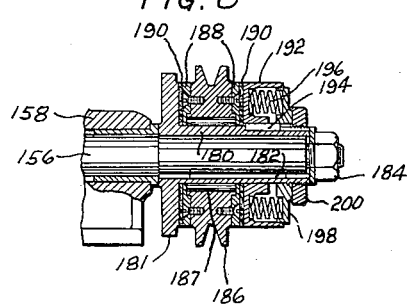

April 2, 1935.  R. R. GUEMPEL  1,996,415
ASSEMBLING MACHINE
Filed Oct. 18, 1932  11 Sheets-Sheet 4
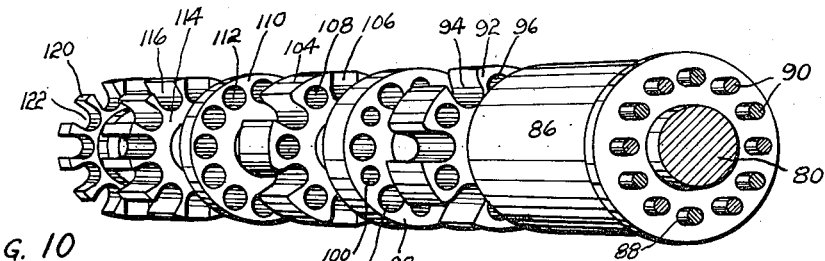
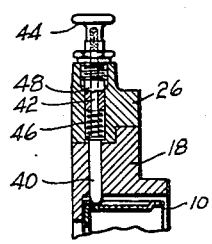
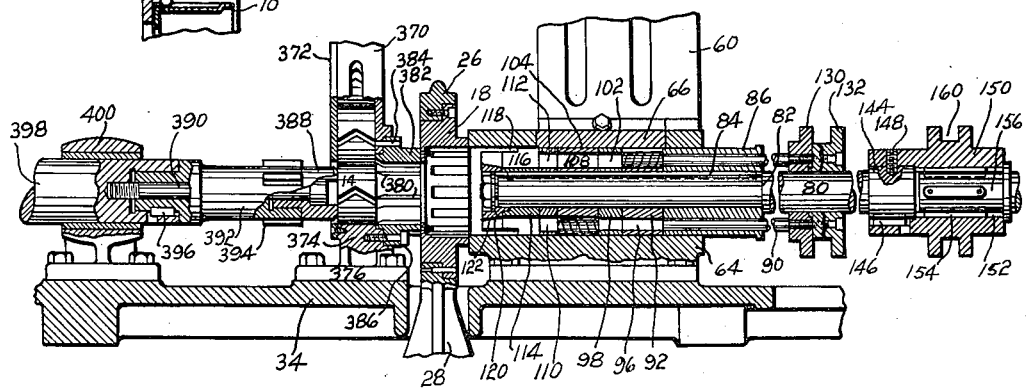
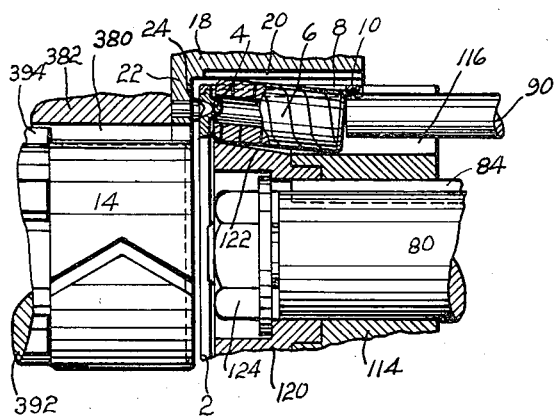
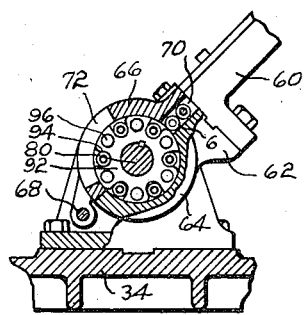
INVENTOR:
ROBERT R. GUEMPEL,
BY
HIS ATTORNEY.

April 2, 1935.   R. R. GUEMPEL   1,996,415
ASSEMBLING MACHINE
Filed Oct. 18, 1932   11 Sheets-Sheet 5

INVENTOR:
ROBERT R. GUEMPEL,
BY
HIS ATTORNEY.

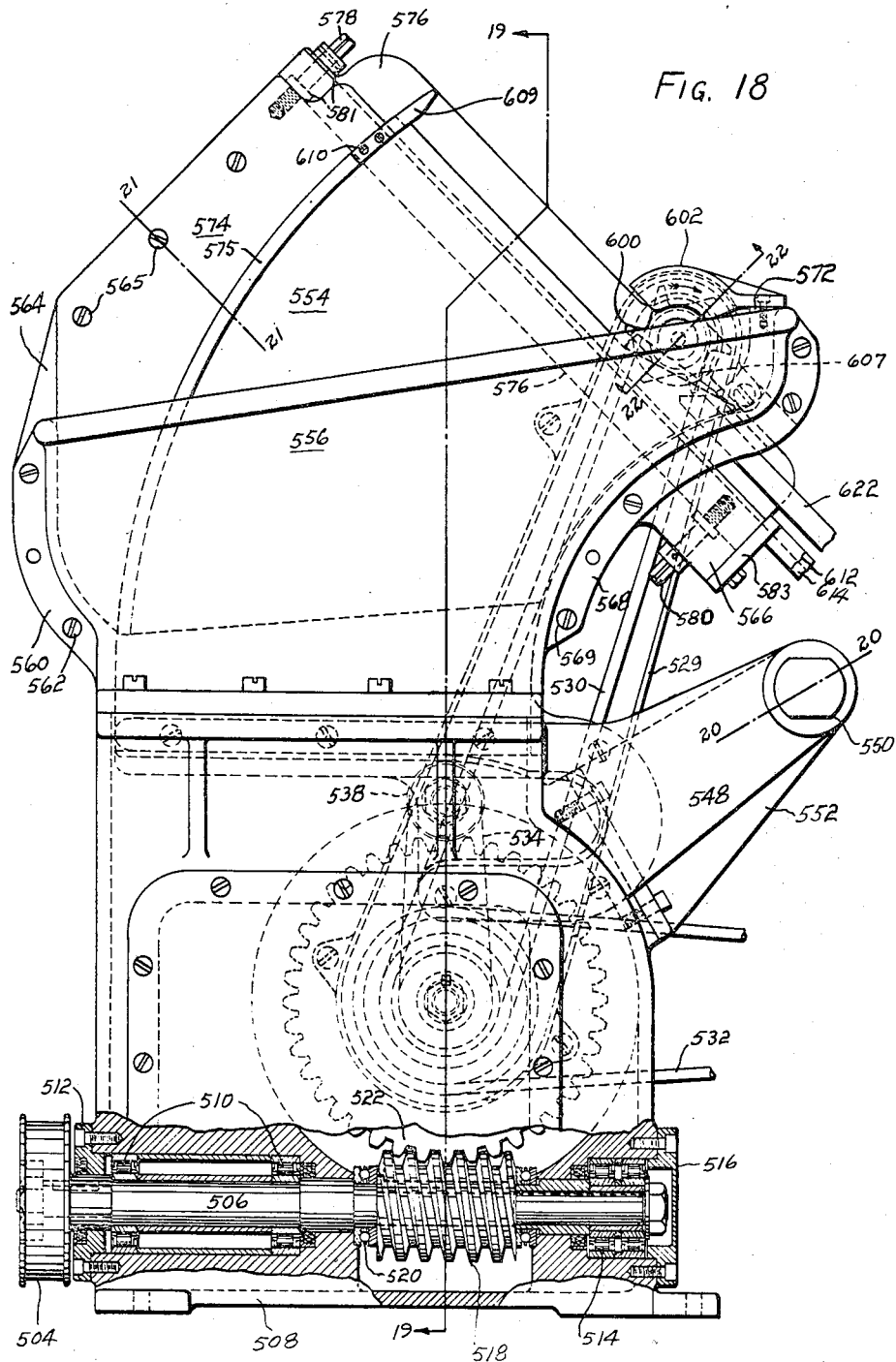

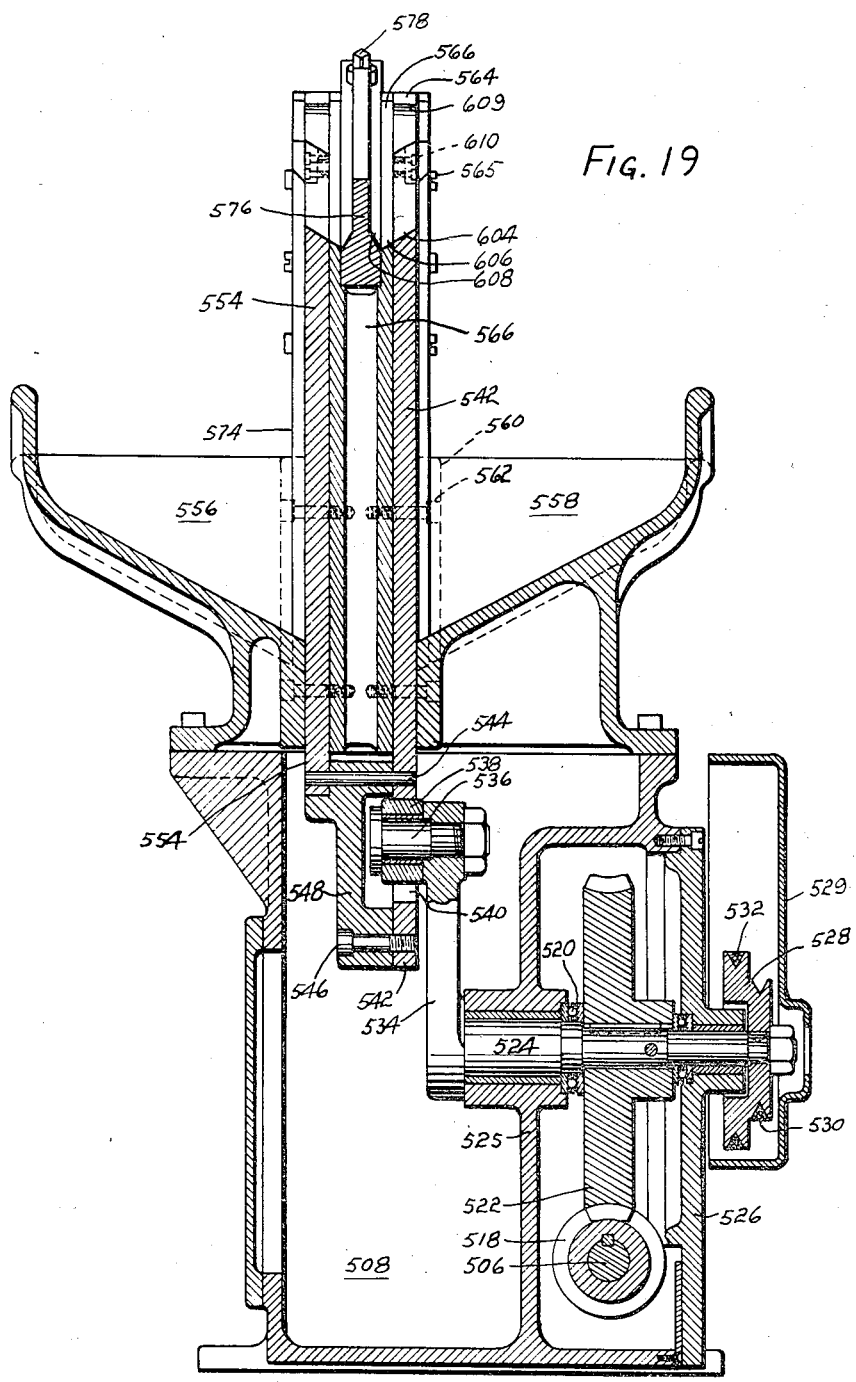

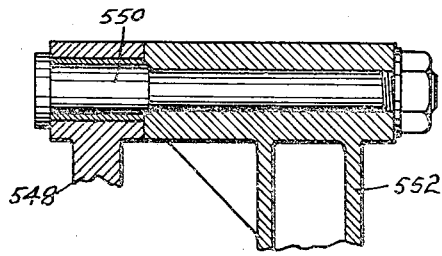
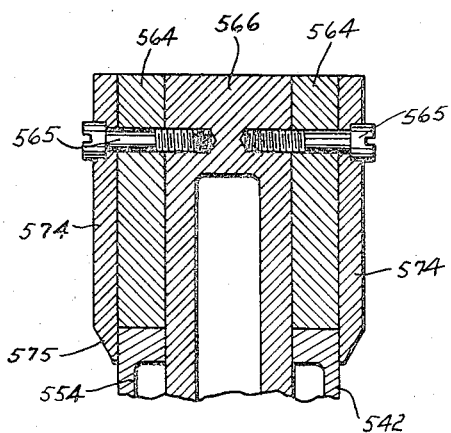
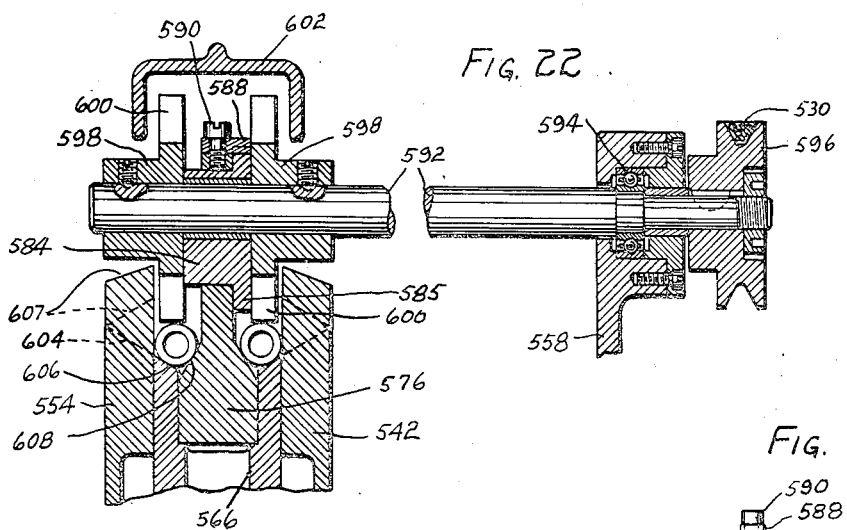
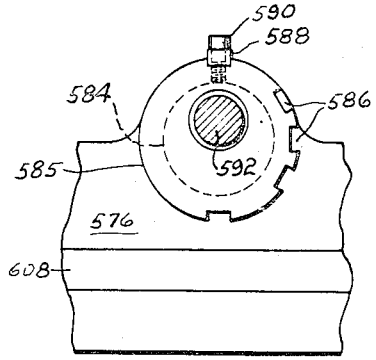

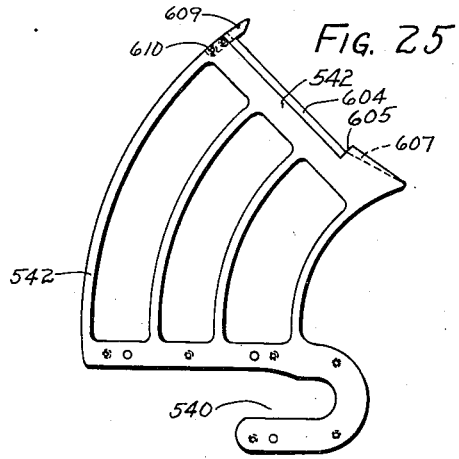
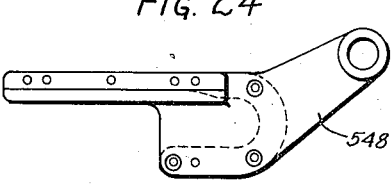
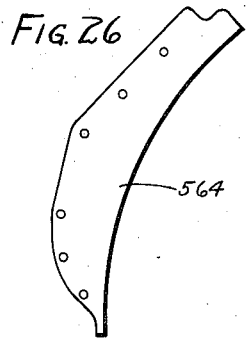
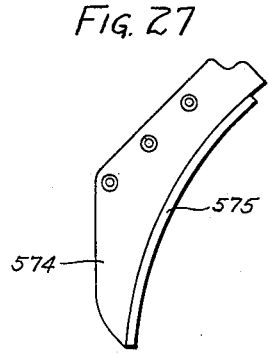
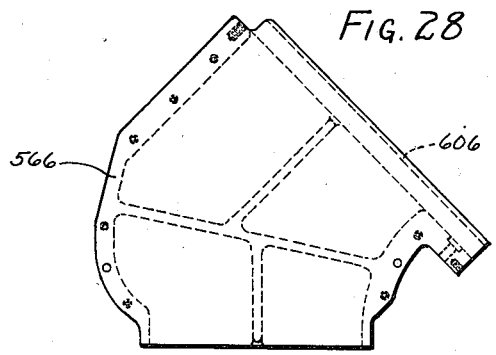
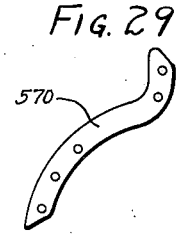
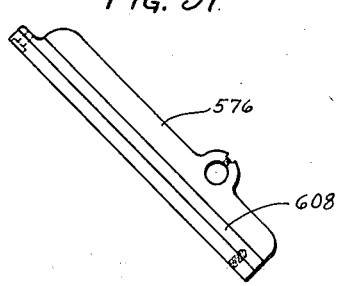

April 2, 1935.  R. R. GUEMPEL  1,996,415
ASSEMBLING MACHINE
Filed Oct. 18, 1932  11 Sheets-Sheet 10
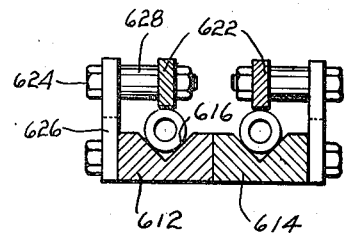
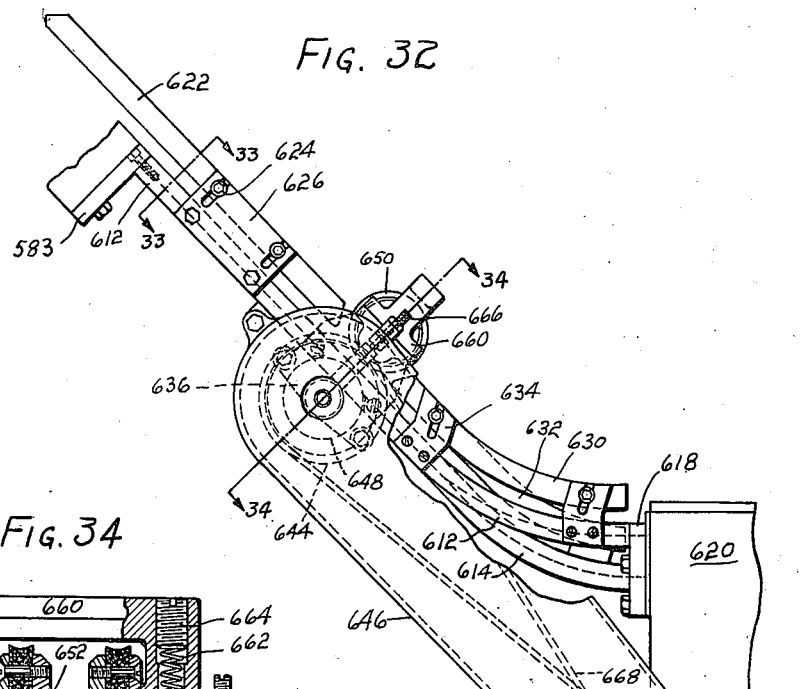
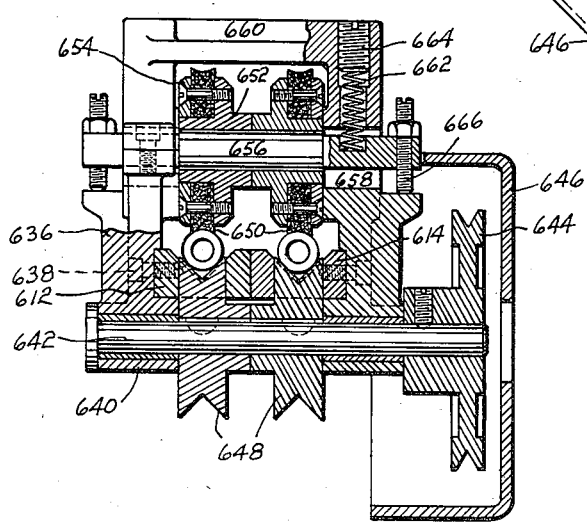
INVENTOR:
ROBERT R. GUEMPEL,
BY
HIS ATTORNEY.

April 2, 1935.  R. R. GUEMPEL  1,996,415
ASSEMBLING MACHINE
Filed Oct. 18, 1932  11 Sheets-Sheet 11

INVENTOR:
ROBERT R. GUEMPEL,
BY
HIS ATTORNEY.

Patented Apr. 2, 1935

1,996,415

UNITED STATES PATENT OFFICE 1,996,415

ASSEMBLING MACHINE

Robert R. Guempel, Hasbrouck Heights, N. J., assignor to General Motors Corporation, Detroit, Mich., a corporation of Delaware Application October 18, 1932, Serial No. 638,340

48 Claims. (Cl. 29—84)

This invention relates to assembling machines and comprises all of the features of novelty herein disclosed. An object of the invention is to provide an improved machine for assembling bearing parts such as bearing rollers with a cage or separator. Another object is to provide improved apparatus for feeding articles, especially right and left hand articles which are to be paired or alternately arranged in a series. Another object is to provide an improved method of assembling parts of a bearing.

To these ends and also to improve generally upon machines of this character, the invention consists in the various matters hereinafter described and claimed. In its broader aspects, the invention is not necessarily limited to the specific construction and steps selected for illustrative purposes in the accompanying drawings in which Fig. 1 is a longitudinal sectional view of the machine with some parts shown in front elevation.

Fig. 2 is a sectional view of a portion of a bearing.

Fig. 3 is a transverse cross-sectional view with some parts shown in side elevation.

Fig. 4 is an enlarged cross-sectional view with some parts omitted or broken away.

Fig. 5 is a sectional view of a detail.

Fig. 6 is a sectional view taken about on the line 6—6 of Fig. 4.

Fig. 7 is a sectional view taken about on the line 7—7 of Fig. 4.

Fig. 8 is a sectional view taken about on the line 8—8 of Fig. 4.

Fig. 9 is a perspective view of certain assembling elements in a separated position.

Fig. 10 is a sectional view of a portion of the holder.

Fig. 11 is a longitudinal sectional view of the holder and associated elements.

Fig. 12 is an enlarged sectional view of a portion of Fig. 11 with the elements in a different position.

Fig. 13 is a cross sectional view of a head.

Fig. 18 is a front view, partly broken away and in section, of hopper feed mechanism.

Fig. 19 is a vertical sectional view taken about on the line 19—19 of Fig. 18.

Fig. 20 is a sectional view of a detail taken on line 20—20 of Fig. 18.

Fig. 21 is a sectional view taken about on the line 21—21 of Fig. 18.

Fig. 22 is a sectional view taken about on the line 22—22 of Fig. 18.

Fig. 23 is a front view of an eccentric and associated parts.

Fig. 24 is a front view of a lever.

Fig. 25 is a front view of a lifting blade.

Fig. 26 is a front view of a filler.

Fig. 27 is a front view of a guard plate.

Fig. 28 is a front view of a partition.

Fig. 29 is a front view of a filler.

Fig. 30 is a front view of a block.

Fig. 31 is a front view of an adjusting plate.

Fig. 32 is a front view of a feed chute.

Fig. 33 is a sectional view taken about on the line 33—33 of Fig. 32.

Fig. 34 is a sectional view taken about on the line 34—34 of Fig. 32.

Figure 14:
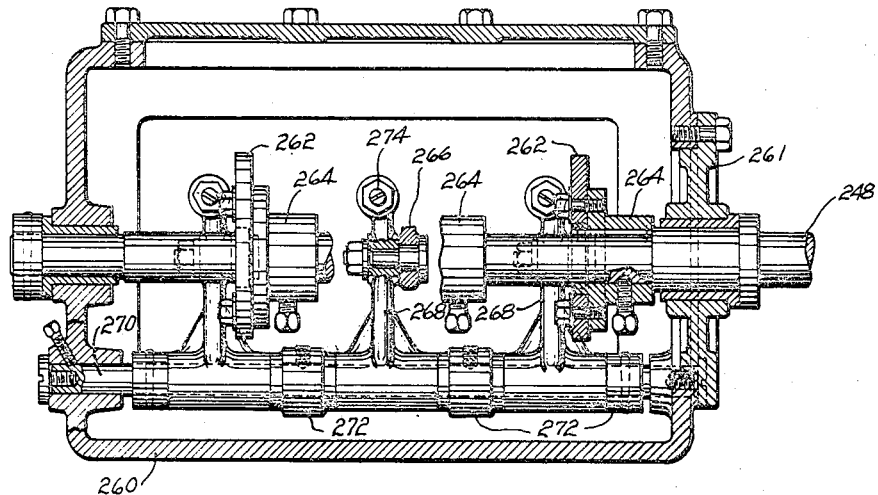
Fig. 14 is a horizontal sectional view of a cam box.

As shown in Figs. 2 and 12, the particular bearing with reference to which the present machine is especially designed comprises a pair of end rings 2 having pressed projections or teats 4 to enter the ends of hollow rollers 6 which are arranged in a circular series and project circumferentially through openings or slots 8 in a sleeve or shell 10. The shell has its side edges spun inwardly into grooves in the end rings as indicated at 12 and the rollers are retained by the teats against loss in handling. When the bearing is in use, the rollers are guided by the edges of the shell openings, those portions of the shell between the openings being dished to form strong cross connections between the end rings. When the rollers are of the spirally wound type illustrated, it is desirable to have some wound right handed and some wound left handed, with such rollers alternating in a circular series in order that oil will be worked back and forth across the bearing. In such a bearing, the cage cannot be entirely completed before inserting the rollers and, accordingly, the present machine inserts the rollers into the openings before the second end ring is attached to the shell (see Fig.

12). The rollers are pushed endwise into the open end of the partly assembled cage and are cammed outwardly into the shell openings, an expansive split spring ring or sleeve 14 then being pushed inside of the circle of rollers to hold them temporarily pending the further operation of attaching the second end ring to the shell.

The partly assembled cage is slipped endwise into a hollow holder 18 (see Figs. 1, 3, 10, 11 and 12) having internal grooves 20 which provide clearance for the rollers when the latter are cammed outwardly into the cage openings. The holder 18 has a flange 22 provided with three or more locating pins 24 designed to engage the hollows formed by the teats 4 to locate the cage openings in registration with the grooves 20. The holder 18 is also externally flanged at one end and is secured by dowel pins and screws to a ring 26 formed at the upper end of a swinging arm 28 which is pivoted on a shaft 30 hung in lugs 32 fastened to the bottom of a bench or table 34. The ends of the table 34 are bolted to legs or hollow standards 36 and 38 to form a main frame. The arm 28 is swingable from a front, cage-loading position to a rear, roller-inserting position.

To lock the cage against rotation, a locking plunger (see Fig. 10) is slidable radially in the holder 18 and in the ring 26 to enter a trough in the cage shell 10, the shell desirably having such troughs or dished-in portions between the roller openings to stiffen the cage. The plunger has a reduced shank 42 secured to a knob 44 by which the plunger can be retracted against the tension of a coil spring 46 interposed between a washer on the plunger and a bushing 48, the bushing guiding the shank and having a threaded portion adjustable in a tapped opening in the ring 26. The swinging arm 28 has a handle 50 for manual operation and is limited in its forward swing by a stop surface 52. The arm is stopped in its rearward swing by a stop block 54 engaging the table 34 and so locating the cage holder 18 in alignment with other assembling mechanism.

The detail mechanism for feeding the rollers will be later described and it will suffice for the present to state that the rollers roll down an inclined chute 60 in two streams, the right hand wound rollers being in one stream and the left hand rollers in the other. The chute 60 (Fig. 13) is fastened to a bracket 62 having a long hollow head 64 provided with a central section or cap 66 which is hinged on a pin 68 for forward swinging to expose the interior. The head has two radial slots 70 forming passages to admit the rollers to the head from the two roller streams in the chute 60. Slots 72 in the cap afford inspection openings for viewing the rollers.

A shaft 80 (see Figs. 9, 11 and 12) which can both rotate and slide axially has a shoulder 82 and a long keyway receiving a key 84 by which a series of hollow members are secured against relative rotation. The first member is a flanged guide section 86 having a circular series of guiding holes 88 for a series of ejector rods 90. The next section 92, when it rotates past one of the slots 70, receives the left hand rollers one by one in a series of notches 94 which have one side wall rounded, the ejector rods subsequently being advanced through the notches and through guiding holes 96 which alternate with the notches. Next comes a spacer section 98 having guide holes 100 for some of the ejector rods and larger holes 102 to let the left hand rollers pass endwise through them. The next section 104 receives the right hand rollers in notches 106, holes 108 alternating with the notches to guide the left hand rollers. It will be noted that the roller receiving sections, which are keyed to the shaft 80, have their roller notches staggered with respect to one another so that the right and the left hand rollers can be alternately arranged in a circular series. The next section 110 is provided with a series of holes 112 large enough for all the rollers to pass through endwise. The next section 114 is provided with open grooves 116 for all the rollers and it is also recessed at 118 to provide a clearance for the end portion of the cage sleeve 10 when the sections are advanced to assembling position. The next section 120 is provided with roller receiving notches 122 which incline outwardly away from the shaft and these inclinations afford cams which cause the rollers to move outwardly into the openings 8 of the cage in which position they are ready to receive the expansible spring sleeve 14. All the sections are clamped together on the shaft 80 by a nut 124.

Figure 16:
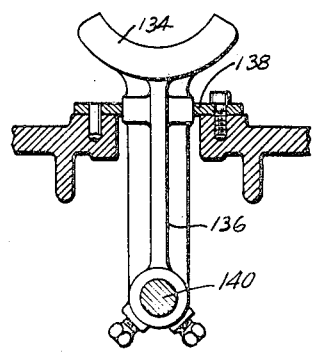
Fig. 16 is a cross sectional view of a shifting mechanism.

The ejector rods 90 are fastened to a collar 130 which is in turn fastened to a similar collar 132 to provide a groove receiving a fork 134 (Figs. 1 and 16) on an upright arm 136 which is guided in a slot of the table 34 by guide strips 138. The arm is secured by set screws to a piston rod 140 projecting from a cylinder 142 which is fastened to the bottom face of the table. The collars 130 and 132 are slidably guided by the rotary slide shaft 80 which has a head 144 (Fig. 11) provided with a key 146 and a set screw 148 for attaching to it a coupling 150. The coupling is provided with four keyways 152 engaging keys 154 fastened in slots in a rotating drive shaft 156 which is journalled for rotation in a bearing bracket 158 bolted to the table. The coupling 150 is grooved at 160 to receive a fork 162 (Fig. 1) on a vertical arm 164 which is guided in a slot of the table by guide strips 166. The arm is secured by a set screw to a piston rod 168 projecting from a cylinder 170 fastened to the bottom of the table.

Referring to Fig. 8, a sleeve 180 having a flange 181 is secured by a key 182 and a clamping nut 184 to the projecting end of the drive shaft 156 and this sleeve is frictionally driven in order that the roller receiving sections 92 and 104 may receive their rollers from the inclined chute without jamming the mechanism. A belt pulley 186 revolves on rollers 187 surrounding the sleeve 180, and wear plates 188 are fastened by screws to opposite sides of the pulley. Outside of the wear plates are sets of friction washers 190, one set bearing against the flange 181 and the other set bearing against a plate 192 which is secured by a key 194 to the sleeve 180 and provided with recesses for coil springs 196. The springs abut against a disc 198 held against rotation by the key 194 and retained in adjusted position by a nut 200 which is threaded on the sleeve.

Referring to Figs. 1 and 3, a belt 202 passes around the pulley 186 and around a larger pulley 204 on a shaft 206 projecting from a housing 208 containing any suitable speed reducing drive gearing. The gearing has a drive shaft 210 with a pulley driven by a belt 212 extending down around a pulley 214 on the shaft of a motor 216 whose frame is pivoted at 218 on a plate 220 which is vertically adjustable on the leg 38 of the main frame. A smaller pulley 222, conveniently made integral with the pulley 204, has a belt 224 extending downwardly around a large pulley 226. The belt is adjusted by an idler pulley 228 rotatably mounted on a horizontal slide plate 230 guided in ways on a bracket 232 and clamped in adjusted position by a bolt 234. The first mentioned belt 202 is likewise held tight by a similar idler roller 236 carried by a vertical slide plate 238 which is guided in vertical ways of a bracket 240 and secured in adjusted position by a clamping bolt 242.

The large pulley 226 (Figs. 1, 3 and 4) frictionally drives a cam shaft 248 in the same way and by mechanism similar to that by which the shaft 156 is driven by its pulley 186, such mechanism comprising a sleeve 250 with a flange 251, a pair of wear plates 252, two sets of friction washers 254, a plate 256 containing springs and an abutment disc 258 held on the sleeve by a nut.

The cam shaft 248 (Figs. 1, 4 and 14) is journalled in a cam box 260, one bearing being carried by a removable cap 261. The shaft carries three cams 262 fastened to flanged hubs 264 which are keyed to the shaft and fastened by set screws. The cams are similar but arranged to operate in proper sequence to effect the operation of advancing the ejector rods with the rollers towards the cage, camming out the rollers into the cage, and inserting the split spring sleeve 14. Each cam engages a cam roller 266 carried near the middle of a lever 268 which is pivoted on a shaft 270 carried by the cam box, the shaft having suitable spacing and locating collars 272 to position the levers. The free end of each lever carries an abutment screw 274 arranged to engage the upper end of a valve stem 276 which projects vertically through a cylindrical opening in a valve body 278 which is bolted to the bottom of the cam box. Each valve stem is urged upwardly by a coil spring 280 abutting against check nuts 282 on the stem and against a packing gland 284.

Referring to Figs. 4, 5, 6 and 7, the flange 181 of the sleeve 180 is provided with an index notch 290 for engagement with a dog or locking pawl 292 which is carried by a plate 294 slidably fitting in an oblong notch of a lever 296. The plate has a flange 298 engaging the side of the lever and is clamped in adjusted position by a nut 300 threaded on a stud projecting from the plate. For adjusting the plate 294 in the notch, an adjusting screw 302 enters a tapped opening in the plate and engages the bottom wall of the notch. A collar 304 on the screw engages the opposite wall of the notch and the screw has a squared end by which it can be turned to move the pawl lengthwise of the notch. The lever 296 is swivelled on a stud 306 projecting from a bearing lug 308 on the bracket 158. The remaining arm of the lever is provided with an oblong notch slidably receiving a plate 310 having an abutment flange 312 engaging the side of the lever, a clamping nut 314 holding the plate in adjusted position. The plate is tapped to receive an adjusting screw 316 similar to the screw 302 above described. Projecting from the plate is a shouldered pivot stud 318 pivotally connecting the arm to a link 320 extending downwardly and carrying a shouldered pivot stud 322 connecting it to a lever 324. The lever 324 is swivelled on a stud 326 supported by the cam box and is provided with a dog or locking pawl 328 arranged to engage an index notch 330 in the flange 251 of the sleeve 250. The end of the lever 324 has a pivot stud 332 entering an eye 334 on a vertical eye-bolt 336 whose shank is slidable in an opening of a lug 338 on the cam box. A coil spring 340 is interposed between the bottom face of the lug and check nuts 342 on the lower end of the bolt.

The above described adjustable pivots provide for holding one of the pawls out of the notch when the other pawl is in its notch, the coil spring 340 tending to hold the pawl 328 in a position to stop rotation of the cam shaft while the drive shaft 156 rotates and effects the filling of the sections with the rollers. To stop rotation of the drive shaft and start rotation of the cam shaft 248, the pivot stud 332 is extended over the end of a short arm 350 held by a set screw 352 and a key to one end of a rock shaft 354 which is journalled in bearing lugs 356 on the front of the cam box. At the end of the shaft opposite to the short arm 350 is secured a curved operating arm 358 having a handle 360. By depressing the handle, the pawl 328 will be raised from its index notch (as soon as the notch 290 reaches its dog 292) and will ride on the top of the flange 251 until the cam shaft has made one revolution and will then stop the shaft. The drive shaft 156 starts rotating again when the other locking pawl 292 is raised from its notch 290. The friction drives permit this alternaitve driving of the shafts.

Figure 17:
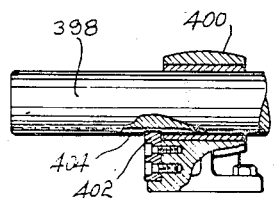
Fig. 17 is a sectional view of a detail near the left end of Fig. 1.
Figure 35:
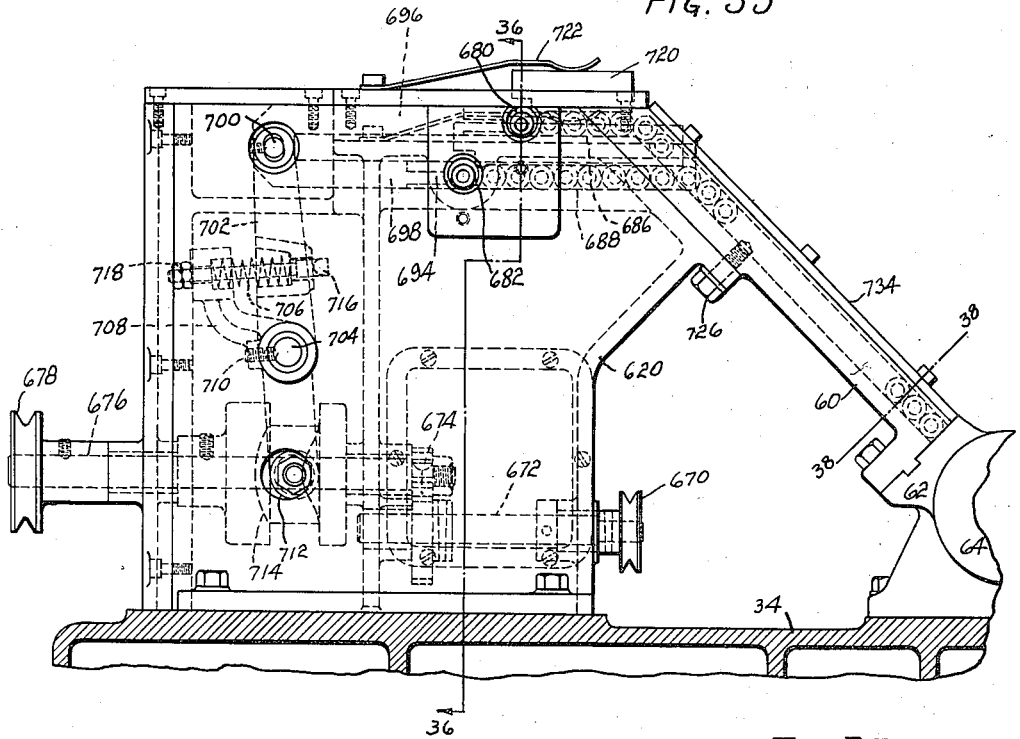
Fig. 35 is a side view of a transfer unit.
Figure 36:
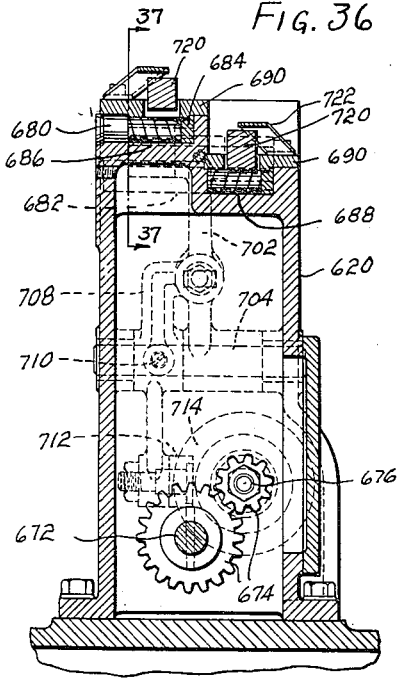
Fig. 36 is a sectional view taken about on the line 36—36 of Fig. 35.
Figure 37:
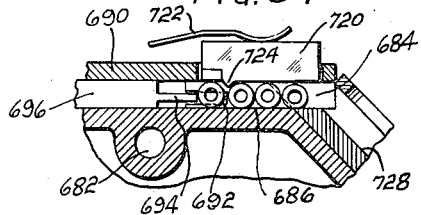
Fig. 37 is a sectional view taken about on the the line 37—37 of Fig. 36.
Figure 38:
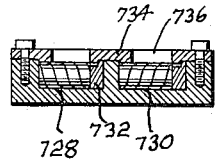
Fig. 38 is a sectional view taken about on the line 38—38 of Fig. 35.

Referring to Figs. 1, 11 and 12, the split spring sleeves 14 are supplied to the machine from a curved chute or magazine 370 of channel section provided with a side cover plate 372. The magazine is conveniently made integral with a hollow terminal head 374 whose base 376 is fastened to the table. The head has internal grooves registering with internal grooves 380 in a bushing 382 which is fastened by a dowel pin 384 and screws 386 to the hollow terminal head. The bushing is internally chamfered at the end adjacent to the magazine in order that each spring sleeve 14 will be caused to contract when it is pushed endwise from the head 374 into the circular series of rollers. A pilot sleeve 388 freely enters the spring sleeve, being secured by the head of a screw 390 to the end of a pusher plug 392 having ribs 394 projecting outwardly and arranged to engage the end of the split spring sleeve. The ribs can advance through the grooves in the magazine head and through the registering grooves 380 in the bushing 382. The plug is secured by a key 396 and the screw 390 to the end of a slide shaft 398 movable in bearing boxes 400 fastened to the table. One of the boxes (Fig. 17) is provided with a key 402 arranged to enter a slot 404 in the slide shaft to prevent shaft rotation. To slide the shaft, it is provided (Fig. 1) with a grooved collar 406 engaged by a fork 408 on an upright arm 410 guided in a slot of the top plate by guide strips 412. The arm is secured by a set screw to a piston rod 414 whose piston reciprocates in a cylinder 416 attached to the bottom of the table. The piston rod is also supported by a guide box 420.

Figure 15:
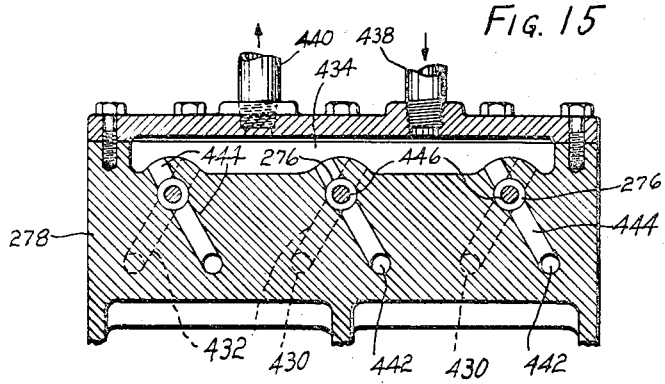
Fig. 15 is a horizontal sectional view of a valve body.

All three of the cylinders are alike except as to length and have hollow cylinder heads 422 providing ports communicating with pipe unions 424 connected to pipes 426 which extend around to similar unions 428 which connect them with ports in the valve body. All three valves in the body are alike and the valve stems are all alike but operate at different times under control of the cams. Each pipe of a pair communicates with a short vertical port 430 (Figs. 4 and 15) having lateral ports 432 spaced apart a short distance vertically and intersecting the chamber occupied by the valve stem 276 and extending to chambers 434 and 436 which are connected to a high pressure supply pipe 438 and a low pressure return pipe 440, respectively. The remaining pipe of each pair communicates with a long vertical port 442 having lateral ports 444 widely spaced apart vertically and intersecting the valve stem opening and extending to the upper and lower chambers 434 and 436. Each valve stem has two necked-down portions 446 spaced apart vertically the same distance as the first and third lateral ports or the second and fourth lateral ports. Thus the reciprocation of the valve stem provides for the double action of the respective cylinder.

A suitable guard 450 is provided for the pulleys, another guard 452 for the ejector rods and a third guard 454 for the sliding pusher. A side door 456 is attached to the leg 38 to provide for access to the cam shaft and pulleys.

Referring to Figs. 1, 18 and 19, a motor 500, housed in the left standard 36, has a driving pulley connected by a belt 502 to a pulley 504 on a shaft 506 which is journalled in a frame 508 supported at one corner of the table. The shaft is journalled near one end in roller bearings 510 protected by an end cap 512 and is journalled near the other end in roller bearings 514 protected by an end cap 516. A worm 518 is keyed to the shaft between thrust bearings 520 and drives a worm wheel 522 keyed to a crank shaft 524 journalled in a frame web 525 and in a removable cover 526. A pulley 528 is fixed to the end of the shaft within a guard 529 and has two grooves for driving belts 530 and 532. A crank arm 534 on the shaft carries a crank pin 536 on which is journalled a roller 538 operating in a slot 540 of a vertical fin or lifting blade 542 which is secured by dowel pins 544 and screws 546 to a swinging arm 548. The arm is bent upwardly outside of the frame 508 and is journalled at its end on a shouldered pivot pin 550 carried by a bracket 552 which is bolted to the frame. A second lifting blade 554 is secured to the arm 548 in parallel spaced relation to the lifting blade 542. The lifting blades swing in vertical planes between hopper sections 556 and 558 which are bolted to the frame in spaced relation. Rollers which are wound right handed go in one hopper section and rollers wound left handed go in the other.

Flanges 560 at the far ends of the hopper sections are secured by screws 562 to fillers 564 which lie in the vertical planes in which the lifting blades are oscillated. The fillers are secured by the same screws 562 and by other screws 565 to a central partition or spacer 566 which passes all the way across between the hopper sections and presents flat guide faces to the sides of the lifting blades. The remaining ends of the hopper sections also have flanges 568 secured by screws 569 to fillers 570 at the sides of the partition 566 and at the sides of a small spacer 572. Guard plates 574 are secured outside of the fillers 564 by the screws 565 and have bevelled edges 575 which lap over arcuate edges on the lifting blades. A bar 576 is adjustably secured in an inclined position to the central partition 566 by screw studs 578 and 580. The screw stud 578 enters a tapped opening in the partition and has spaced collars 581 which hold it from moving endwise in the bar 576. The screw stud 580 enters a tapped opening in the bar 576 and is held by collars from endwise movement in an extension of the partition. By turning the screws the bar can be adjusted up and down in a longitudinal recess at the upper edge of the partition, the purpose of the adjustment being to adapt the mechanism to feed different sized articles, as will later appear. An end plate 583 guides the lower end of the bar 576.

The bar 576 has a round opening (Figs. 22 and 23) receiving an eccentric 584 which is provided with a flange 585 having notches 586. A locking plate 588 is fastened by a screw 590 to the bar 576 and is adapted to extend laterally into any selected one of the notches to hold the eccentric in a rotatively adjusted position. The eccentric carries a bearing bushing for a rotatable shaft 592 which is also journalled in a ball bearing 594 carried by one wall of the hopper section 558. The shaft is driven by a pulley 596 having a groove for the belt 530. A pair of star wheels 598 are secured to the shaft by set screws and are provided with fingers 600 operating inside of a guard 602. The upper edges 604 of the lifting blades are inclined laterally so that rollers lifted thereby along the sides of the partition will ultimately roll laterally onto similarly inclined edges 606 at the top of the partition. The bar 576 has laterally inclined sides 608 which together with the edges 606 form steeply sloping chutes or guides in which the rollers slide endwise out of the hopper sections. The fingers 600 on the star wheels are intended to wipe backwardly any rollers which pile up or do not properly seat themselves in the chutes and the adjacent portions of the lifting blades are extended to form side guides, their upper edges being inclined outwardly as at 607 to reject rollers and prevent crowding near the outlet. The adjustment of the bar 576 is to locate the inclined edges 608 to suit rollers of different sizes and, since such adjusting movement of the bar would otherwise be prevented by the shaft 592, the adjustable eccentric is utilized to provide a movable shaft bearing for compensation. A knockout plate 609 is fastened by screws 610 in a projecting position at the upper edge of each lifting blade and its edge face is bevelled to remove rollers from the arcuate channel formed between the central partition 566 and the arcuate edges of the guard plates 574.

Referring to Figs. 32, 33 and 34, a pair of inclined chutes 612 and 614, each having V-shaped guide grooves for the rollers, are fastened at their upper ends to the end plate 583 while their lower ends are secured to an anchor plate 618 carried by a frame 620. Each chute is curved at the lower end to approach a horizontal position but one chute 612 is more sharply curved than the other to come into a horizontal position at a higher level. Guard rails 622 are adjustably fastened by bolts 624 entering slots in brackets 626 carried by the chutes, spacing sleeves 628 positioning the guard rails directly over the grooves 616. The guard rails hold the rollers in aligned position in the grooves 616, the adjustment providing a proper space depending on the diameter of the rollers. The guard rails extend upwardly close to the star wheels and over the chutes formed by the inclines 606 and 608 which are in alignment with the grooves 616. Lower guard rails 630 and 632 are adjustably supported by brackets 634 and overlie the lower portions of the bent chutes 612 and 614.

At a space between the upper and the lower guard rails, brackets 636 are fastened by screws 638 to the chutes 612 and 614. Bearing lugs 640 on the brackets rotatably support a shaft 642 having a driving pulley 644 housed in a belt guard 646. Grooved feed rolls 648 are keyed to the shaft and project through slots in the chutes to engage the rollers. Pressure rolls 650 also engage the rollers and each is preferably composed of compressible material such as leather clamped between a flanged hub 652 and a clamping washer 654, all rotatable on a shaft 656. The shaft is guided for bodily movement in mating slots 658 in the brackets 636 and in a cap 660 fastened to the latter. Coil springs 662 are interposed between the shaft and adjusting plugs 664 threaded in the cap. The springs yieldingly force the pressure rolls towards the driving rolls as far as permitted by adjustable stop screws 666 carried by the ends of the shaft 656. The pulley 644 is driven by a crossed belt 668 extending from a pulley 670 on a shaft 672 which is journalled in the frame 620.

Referring to Figs. 35 to 38, the shaft 672 is driven by gearing 674 from a shaft 676 having a belt pulley 678 which receives its power from the belt 532. The chutes 612 and 614 of Fig. 32 are aligned at their bent lower ends with passages 680 and 682, respectively, the entrance ends of the passages being chamfered to facilitate entry of the rollers. At the other end of each passage is a removable guide plate 684 to engage the ends of the rollers, the lower passage 682 being the deeper to let the left-hand rollers pass entirely beyond the right hand rollers. An upper cross channel or guide 686 intersects the upper passage 680 and a lower cross channel or guide 688 intersects the lower pasage 682, each guide being closed by a top plate 690 having a projection to engage a little flange on the guide plate 684 to hold the latter. The thickness of the guide plates 684 is selected in accordance with the length of the rollers and is such as to let the rollers roll freely sidewise from the passages 680 and 682 into the intersecting channels or guides 686 and 688. Each guide plate has a notch 692 directly opposite to the passage 680 or 682. The notches are too small to receive the rollers but are large enough to admit flat pushers 694 projecting from pusher slides 696 and 698 which reciprocate in the guides 686 and 688.

To actuate the pusher slides, the upper slide has a downwardly extending lug and the lower slide has an upwardly projecting lug, both lugs being loosely pivoted by a common pivot pin 700 to the upper end of an arm 702 which is loosely mounted on a cross shaft 704 for rocking movement. A coil spring 706 is interposed between the arm 702 and a bent arm 708 on a lever which is secured by a set screw 710 to the shaft 704. The lower arm of the lever carries a cam roll 712 entering a cam groove in a cam 714 fixed to the shaft 676. As the cam rotates, the lever is oscillated and a yielding force is transmitted in one direction to the arm 702 by the coil spring. The pushers thus can give in the feeding direction to avoid jamming the rollers. Each pusher is positively retracted by a T-bolt 716 whose head engages the arm 702 and whose shank passes through both arms 702 and 708 to receive check nuts 718.

To insure the travel of the rollers sidewise in peripheral relation without twisting or skewing, a pressure pad 720 is movably supported in a slot of each cover plate 690 and is urged downwardly against the rollers by a leaf spring 722. The pad is recessed where the rollers enter endwise but carries a small rib 724 a little in advance of the entrance position. When the roller enters and is pushed sidewise, it engages the rib and is thereby located squarely at right angles to the desired course of travel. The rollers are pushed or rolled forward in the guides 686 and 688 at different levels towards the inclined chute 60 which is secured by bolts 726 to an inclined face on the frame 620. The chute 60 has two parallel guideways 728 and 730 for the rollers and each guideway has a removable side plate 732 whose thickness depends on the lengths of the rollers. The side plates are held by a cover plate 734 having suitable slots 736 through which the rollers can be observed. The guideways are alike except that one guideway 728 is longer than the other to extend up and receive the rollers pushed from the higher guide 686. The guideways 728 and 730 register with the before mentioned slots 70 in the head 64. Left wound rollers pass through one such slot to the notched loading section 92 and right wound rollers pass through the other slot to the notched loading section 104.

In operation, the magazine 370 is filled with spring sleeves 14 and bearing rollers are dumped into the hopper sections, all those placed in the hopper section 556, for instance, being wound right-handed and all those in the other hopper section 558 being wound left-handed. Rotation of the crank shaft 524 causes the lifting blades 542 and 554 to oscillate in parallel vertical planes around an axis at the pivot 550. In the lowermost position of the blades, their upper inclined edges 604 pass below the inclined bottoms of the hopper sections, and some of the rollers gravitate onto the inclined edges of the blades with the roller peripheries against the adjacent smooth faces of the partition 566. As the blades rise, any rollers which extend crosswise of the blades become overbalanced and drop back into the hopper sections while those lined up in end to end relation are lifted to the top of the partition and roll laterally onto the guides formed by the inclined edges 606 of the partition and by the inclined sides 608 of the bar 576. In such position, the two streams of rollers are ready to slide endwise under the star wheel fingers 600 and into the chutes 612, 614. The star wheels rotate in such a direction as to dislodge any piled-up or otherwise improperly located rollers if the inclines at 607 have not already eliminated them. The rollers slide endwise in the chutes, their speed being regulated by the feed rolls 648 and pressure rolls 650. The rollers in the chute 612 slide endwise into the passage 680 and the rollers in the chute 614 slide endwise into the deeper passage 682. The oscillating pushers 694 then push the rollers intermittently sideways along the guides 686 and 688 until the rollers enter the chute guideways 728 and 730 to roll therein by gravity to the slots 70 in the head 64.

As the shaft 80 rotates (clockwise in Fig. 13) the sections 92 and 104 present their notches one-by-one to the slots 70 until the sections are full of rollers. Meanwhile the operator has swung the holder 18 forwardly by the handle 50, has inserted a cage endwise, locked it with the plunger 40, and has swung the holder back into alignment with the heads 64 and 374. Upon depressing the handle 360, the locking dog 328 is raised from the notch 330 and the cam shaft 248 begins to rotate. The locking dog 292 simultaneously enters the notch 290 and the shafts 156 and 80 are locked from rotation. The first cam 262 depresses its valve stem to control admission of pressure fluid to the right hand cylinder 170 and all of the sections are shifted axially with the shaft 80. The middle cam 262 depresses its valve stem 276 to control admission of pressure fluid to the middle cylinder 142 and the ejector rods 90 are slid endwise to push the rollers endwise through the various sections. The ejector rods have a greater movement than the sections so that the parts come into the position of Fig. 12 with the ends of the rollers on the teats 4 of the end ring 2 and with the rollers partially expanded into the openings of the cage by the inclines 122. The third cam 262 depresses its valve stem to control admission of fluid to the left cylinder 418 and the plug 392 advances to the right to push a spring sleeve 14 endwise from the magazine head 374 into the circular series of rollers. The plug is temporarily stopped when it abuts against the shaft 80 but resumes its advance when the shaft 80 and its sections return to the right to make way for the spring sleeve. The ejector rods 90 remain in position while the section 120 returns so that the unexpanded ends of the rollers are cammed outwardly into the cage openings where they are held by the advancing spring sleeve. Then the plug 392 and the ejector rods 90 return to the original position under control of the cams and cylinders, the cam shaft 248 stopping after one revolution because the locking dog 328, after riding on the flange 261, is urged into the notch 330 by the action of the coil spring 340. Of course, the other locking dog 292 is simultaneously raised from its notch 290 so that the shaft 80 is again frictionally driven to fill the empty sections again. The assembling action is automatic except for inserting the cages in the holder and actuating the starting handle.

I claim:

1. In a machine for assembling rolling elements in openings of a cage, mechanism for arranging the rolling elements in a circular series, and mechanism for moving the series of rolling elements inside the cage and expanding them outwardly into the cage openings; substantially as described.

2. In a machine for assembling a series of rolling elements in openings of a cage, means for causing relative movement between the cage and the series of rolling elements in substantially an axial direction to get the one inside the other, and means for moving the rolling elements substantially radially of the cage into the openings; substantially as described.

3. In a machine for assembling a series of rolling elements in openings of a cage, means for causing relative movement between the cage and the series of rolling elements in substantially an axial direction to get the one inside the other, means for moving the rolling elements substantially radially of the cage into the openings, and a spring member for holding the rolling elements in the openings; substantially as described.

4. In a machine for assembling a series of rolling elements in openings of a cage, a cage holder, means for moving the series of rolling elements into the cage substantially axially thereof, and means for expanding the series outwardly into the openings of the cage; substantially as described.

5. In a machine for assembling a series of rolling elements in openings of a cage, a cage holder, means for moving the series of rolling elements into the cage substantially axially thereof, means for expanding the series outwardly into the openings of the cage, and means for inserting a holder within the series of rolling elements; substantially as described.

6. In a machine for assembling a series of rolling elements in openings of a cage, guides extending substantially axially of the cage, means for moving the rolling elements along the guides into the cage, and means for expanding the rolling elements outwardly into the cage openings; substantially as described.

7. In a machine for assembling a series of rolling elements in openings of a cage, a cage holder, guides extending substantially axially of the cage, means for moving the rolling elements along the guides to the cage, and cams for moving the rolling elements substantially radially into the cage openings; substantially as described.

8. In a machine for asembling a series of rolling elements in openings of a cage, a cage holder, guides extending substantially axially of the cage, means for moving the rolling elements along the guides to the cage, cams for moving the rolling elements substantially radially into the cage openings, and means for holding the rolling elements in the openings; substantially as described.

9. In a machine for assembling a series of rolling elements in openings of a cage, guides extending substantially axially of the cage, rods for moving the rolling elements along the guides into the cage, and means for camming the rolling elements outwardly into the cage openings; substantially as described.

10. In a machine for assembling a series of rolling elements in openings of a cage, guides extending substantially axially of the cage, rods for moving the rolling elements along the guides into the cage, means for camming the rolling elements outwardly into the cage openings, and means for inserting a holder within the series of rolling elements; substantially as described.

11. In a machine for assembling a series of rolling elements in openings of a cage, means for moving the rolling elements substantially axially into one end of the cage, means for expanding the rolling elements into the cage openings, and means for inserting a holder into the other end of the cage; substantially as described.

12. In a machine for assembling a series of rolling elements in openings of a cage, means for moving the rolling elements substantially axially into one end of the cage, cams movable through the series of rolling elements to expand them into the cage openings, a spring sleeve, and means for moving the sleeve into the series of rolling elements; substantially as described.

13. In a machine for assembling a series of rolling elements in openings of a cage, a cage holder, a series of guides leading to the holder, rods movable in the guides to push the rolling elements into the cage, and a series of cams for expanding the rolling elements into the cage openings; substantially as described.

14. In a machine for assembling a series of rolling elements into openings of a cage, a cage holder, a series of guides leading to the holder, rods movable in the guides to push the rolling elements into the cage, the guides having cam inclines near the ends thereof, and means for withdrawing the guides from the holder; substantially as described.

15. In a machine for assembling a series of rolling elements in a cage, mechanism for arranging and supporting the rolling elements in a circular series at one end of the cage, means for pushing the circular series endwise as a unit into the cage, a spring sleeve, and means for moving the sleeve into telescoping relation to the series of rolling elements to hold them in the cage; substantially as described.

16. In a machine for assembling a series of rolling elements into openings of a cage, mechanism for arranging and supporting the rolling elements in a circular series at one end of the cage, means for pushing the circular series endwise as a unit into the cage, and means for expanding the series outwardly into the cage openings; substantially as described.

17. In an assembling machine for a cage and rolling elements, a cage holder, mechanism at one end of the cage holder for arranging a predetermined number of rolling elements in a circular series and moving the series into the cage, and mechanism at the other end of the cage holder for feeding a holding sleeve into the series of rolling elements; substantially as described.

18. In an assembling machine for a cage and rolling elements, a cage holder, mechanism at one end of the cage holder for arranging a predetermined number of rolling elements in a circular series and moving the series into the cage, mechanism at the other end of the cage holder for feeding a holding sleeve into the series of rolling elements, and means for moving the cage holder out from between said mechanisms substantially as described.

19. In an assembling machine for a cage and rolling elements, mechanism for arranging rolling elements in a series and moving them towards the cage, a cage holder, and a mounting for shifting the cage holder into and out of alignment with said mechanism; substantially as described.

20. In a machine for assembling a series of rolling elements in openings of a cage, a cage holder having grooves registering with the cage openings to provide clearance for the rolling elements, and mechanism for moving the rolling elements first axially of the cage and then radially thereof; substantially as described.

21. In a machine for assembling a series of rolling elements in openings of a cage, a cage holder having means for locating a cage therein, means for locking the cage in the holder, and mechanism for inserting the rolling elements in the openings; substantially as described.

22. In an assembling machine for a cage and rolling elements, a cage holder, a spring sleeve, and means for tensioning the spring sleeve while moving it into telescoping relation to the cage and rolling elements; substantially as described.

23. In an assembling machine for a cage and rolling elements, a cage holder, a support for a sleeve at one end of the cage holder, and means for transferring the sleeve from the support into telescoping relation to the cage and rolling elements; substantially as described.

24. In an assembling machine for a cage and rolling elements, a cage holder, a bushing at one end of the cage holder, means for forcing a spring sleeve through the bushing into the cage, and the bushing having a tapered surface to contract the spring sleeve; substantially as described.

25. In an assembling machine for a cage and rolling elements, a cage holder, a magazine having a head, a bushing projecting from the head towards the cage holder, the bushing having an internal tapered surface, and means for forcing a spring sleeve from the magazine through the bushing into the cage; substantially as described.

26. In an assembling machine for a cage and rolling elements, a cage holder, a bushing at one end of the cage holder, the bushing having a plurality of grooves and a tapered surface, and a plug having ribs corresponding to the grooves and arranged to push a spring sleeve through the bushing into the cage; substantially as described.

27. In an assembling machine, a hollow head having an entrance passage, a rotary member in the head and having seats movable past the passage, a rotary support having openings in alignment with the seats, and rods guided in the openings and movable through the seats to expel articles therefrom; substantially as described.

28. In a machine for assembling rolling elements and a cage, a member having open seats, means for moving the member to carry the seats successively past a source of supply of rolling elements, mechanism for expelling the rolling elements from the seats and inserting them as a series in the cage, and means for moving the inserted rolling elements radially with respect to the cage; substantially as described.

29. In a machine for assembling rolling elements and a cage, a member having open seats in its periphery, means for rotating the member to fill the seats with rolling elements from a source of supply, a support having a series of openings in alignment with the seats, and a series of rods guided in the openings and movable through the seats for expelling the rolling elements as a circular series and inserting them in the cage; substantially as described.

30. In a machine for assembling rolling elements and a cage, a rotary member having open seats to receive rolling elements from a source of supply, guides extending from the seats towards the cage, means for shifting the guides axially with respect to the cage, and means for pushing the rolling elements from the seats and along the guides; substantially as described.

31. In a machine for assembling rolling elements and a cage, a rotary member having open seats to receive rolling elements from a source of supply, guides extending from the seats towards the cage, means for shifting the rotary member and the guides towards the cage, and means for pushing the rolling elements along the guides into the cage; substantially as described.

32. In a machine for assembling rolling elements and a cage, a shaft, means for turning the shaft, a member fixed to the shaft and having open seats to receive rolling elements from a source of supply, guides extending from the seats towards the cage, a series of rods for pushing the rolling elements along the guides towards the cage, and a rotary support having guides for the rods; substantially as described.

33. In a machine for assembling rolling elements and a cage, a shaft, means for turning the shaft, a member fixed to the shaft and having open seats to receive rolling elements from a source of supply, guides extending from the seats towards the cage, means for shifting the shaft endwise towards the cage, and a series of rods movable with respect to the shaft to push the rolling elements along the guides into the cage; substantially as described.

34. In a machine for assembling rolling elements and a cage, a cage holder, a circular series of guides concentric with the cage holder, a circular series of rods aligned with the guides, means for shifting the rods with respect to the guides, and means for shifting the guides with respect to the cage holder; substantially as described.

35. In a machine for assembling rolling elements and a cage, a cage holder, a circular series of guides concentric with the cage holder, the guides having cam surfaces, a circular series of rods aligned with the guides, means for shifting the rods with respect to the guides, and means for shifting the guides with respect to the rods; substantially as described.

36. In a machine for assembling rolling elements and a cage, a shaft, means for sliding the cage towards the shaft, means for rotating the shaft, and means supported by the shaft for arranging rolling elements in a series and inserting them in the cage; substantially as described.

37. In a machine for assembling articles of different kinds in alternate order in a series, means for arranging articles of one kind in a series with spaces between them, means for arranging articles of another kind in a similar series, each series of articles being aligned with the spaces in the other series, and means for moving one series of articles into the spaces of the other series; substantially as described.

38. In a machine for assembling rolling elements of different kinds in alternate order in a cage, means for arranging rolling elements of one kind in a series with spaces between them, means for arranging rolling elements of another kind in a similar series, each series of rolling elements being aligned with the spaces of the other series, means for moving one series of rolling elements into the spaces of the other series, and means for causing relative movement between the cage and the resulting series of rolling elements; substantially as described.

39. In a machine for assembling rolling elements of different kinds in a cage, means for arranging rolling elements of one kind in a circular series, means for arranging rolling elements of another kind in a similar series, means for combining the two series into a single circular series, and mechanism for inserting the single series in the cage; substantially as described.

40. In a machine for assembling rolling elements of different kinds in a cage, a pair of members having open seats staggered with respect to one another, means for rotating the members to fill the seats with rolling elements from individual sources of supply, and means for expelling the rolling elements from the rotary members and inserting them as a single circular series in the cage; substantially as described.

41. In a machine for assembling rolling elements of different kinds in a cage, a chute for rolling elements of one kind, a companion chute for rolling elements of another kind, rotary members having open seats staggered with respect to one another, each member receiving rolling elements in the seats from one of the chutes, and means for expelling the rolling elements from the seats and inserting them as a single circular series in the cage; substantially as described.

42. In a machine for assembling elongated articles of different kinds, means for guiding articles of one kind sidewise in a stream, means for guiding articles of another kind sidewise in a stream, means for spacing the articles in each stream, and means for combining the articles into a single series with the two kinds alternating; substantially as described.

43. In a machine for assembling elongated articles of different kinds, a pair of guideways in different planes, means for introducing articles of one kind endwise into one of the guideways, means for introducing articles of another kind endwise into the other guideway, means for moving both kinds of articles sidewise in their guideways, and a pair chutes receiving the articles sidewise from the guideways and having their delivery ends in a common plane to conduct the articles into the same plane in two series; substantially as described.

44. In an assembling machine, a rotary shaft having a member for receiving articles from a source of supply, mechanism for expelling articles from the member, a rotary shaft having a cam for controlling the operation of the expelling mechanism, and means for causing the shafts to be driven alternately; substantially as described.

45. In an assembling machine, a rotary shaft having a member for receiving articles from a source of supply, mechanism for expelling articles from the member, a rotary shaft having a cam for controlling the operation of the expelling mechanism, friction driving means for each shaft, and means for locking one shaft when starting the other; substantially as described.

46. In an assembling machine, a rotary shaft having a member for receiving articles from a source of supply, mechanism for expelling articles from the member, a rotary cam shaft, friction driving means for each shaft, a dog for locking each shaft from rotation, and a connection between the dogs for making one effective when making the other ineffective; substantially as described.

47. In an assembling machine, a rotary shaft having a member for receiving articles from a source of supply, mechanism for expelling articles from the member, a rotary cam shaft, friction driving means for each shaft, means for alternately locking the shafts from rotation, and means for making one locking means effective after a single revolution of one of the shafts; substantially as described.

48. In an assembling machine, a pair of rotary shafts, friction driving means for each shaft, a dog for locking each shaft from rotation, and a connection between the dogs for making one dog effective when making the other ineffective; substantially as described.

ROBERT R. GUEMPEL.